Aug. 4, 1936.   R. W. SOHL   2,050,202
METHOD OF MAKING A RUBBER TIRE
Filed March 9, 1935
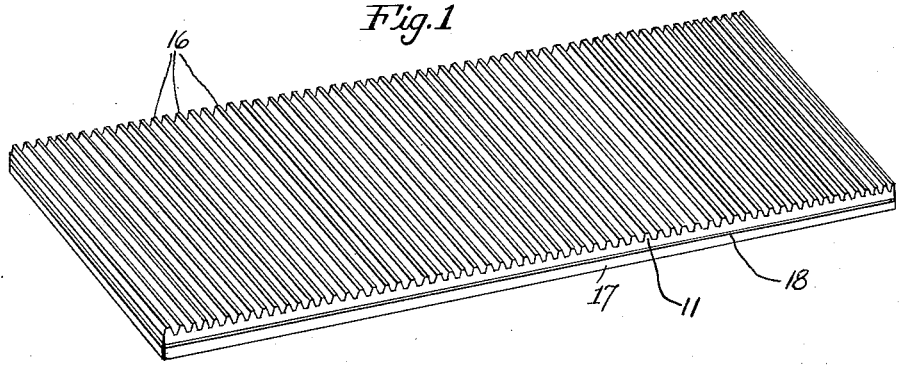
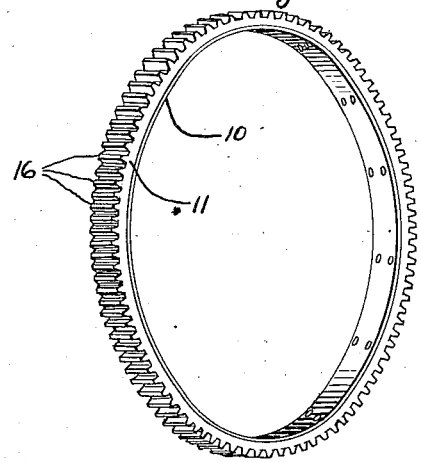
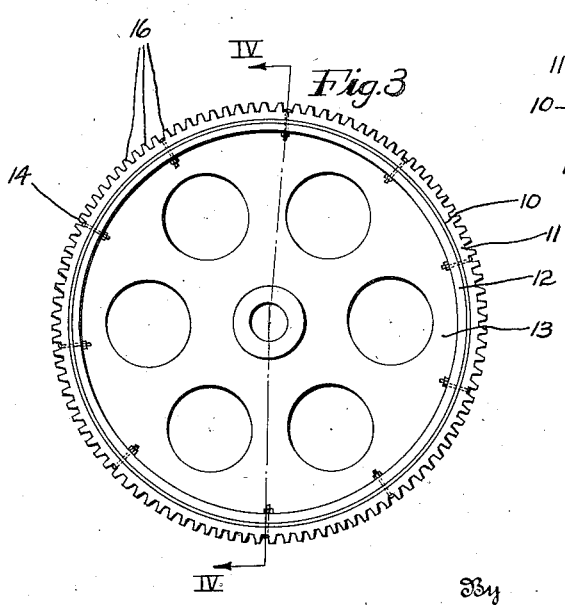
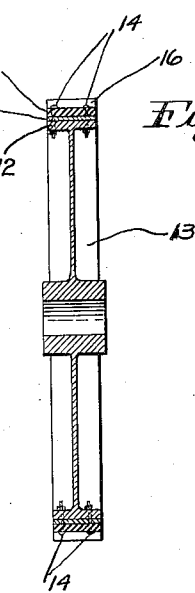
Inventor
Ralph H. Sohl
Attorney Patented Aug. 4, 1936

2,050,202

UNITED STATES PATENT OFFICE 2,050,202

METHOD OF MAKING A RUBBER TIRE

Ralph W. Sohl, Akron, Ohio, assignor to Wingfoot Corporation, Wilmington, Del., a corporation of Delaware Application March 9, 1935, Serial No. 10,223

4 Claims. (Cl. 154—12)

The present invention relates to rubber tires and has particular relation to tires having a tractive tread and adapted for use in connection with wheels of lawn mowers, toys, push carts, industrial trucks and trailers, service wagons, and the like. In a specific aspect the invention refers especially to wheels which are driven by engagement with the ground to furnish power for actuating some other part of the device or vehicle.

One of the objects of the present invention is to provide a tire of the character described which has considerable traction with the ground and which is of a strong and durable construction.

Another object of the invention is to provide a tire which may be manufactured in sheet form and afterwards cut into strips of the desired dimensions and bent into circular form for attachment to the felloe of a wheel.

Still another object of the invention is to provide, as an article of manufacture, a sheet of flexible or bendable metal having a rubber tread portion vulcanized thereto, and which may be cut into strips or bands and bent into circular shape for mounting upon the rim of a wheel.

With these and other objects in view as well as other advantages which may be incident to the use of the improvements, the invention consists in the parts and combinations thereof hereinafter set forth and claimed with the understanding that the several necessary elements constituting the same may be varied in proportion and arrangement without departing from the nature and scope of the invention as defined in the appended claims.

In order to make the invention more clearly understood there are shown in the accompanying drawing, means for carrying the invention into practical effect, without limiting the improvements in their useful application to the particular construction, which for the purpose of explanation have been made the subject of illustration.

In the accompanying drawing:

Fig. 1 is a perspective view of a composite blank from which a plurality of tires may be produced in accordance with the invention;

Fig. 2 is a perspective view of a strip of the material cut from the blank shown in Fig. 1 and bent into circular shape for attachment to the wheel of a lawn mower or the like;

Fig. 3 is a side elevation of a lawn mower wheel having the improved tread or tire secured thereto; and Fig. 4 is a vertical transverse sectional view taken on line IV—IV of Fig. 1.

Referring to Figs. 2, 3 and 4 of the drawing, a tire constructed in accordance with the invention is shown as comprising a circular strip or band 10 of pliable or flexible metal such as brass or steel plated with brass or other rubber-adhering material, and upon which a tread portion 11 of rubber is molded and united to the outer surface by vulcanizing. This circular strip or band 10, together with the tread portion 11, is initially made substantially flat from which shape it is bent to be mounted upon the rim or felloe 12 of a wheel 13, whereon it is secured in position by screws or rivets 14. Certain of the rivets 14 are located adjacent to the abutting ends of the strip 10 and tread 11 so as to prevent these ends from springing radially outwardly, thus destroying the circular configuration of the tire. It may be found desirable to subject the tread 11 to a second vulcanizing operation after the parts are assembled in order to unite the abutting ends of the rubber tread 11, or this may be accomplished by a suitable solvent or cement.

In carrying out the invention, a composite multiple blank is preferably made by placing a body of unvulcanized rubber upon a sheet of metal 17 of suitable dimensions, (Fig. 1). This sheet 17 is preferably of brass or steel plated with brass as indicated at 18 in Fig. 1 or other metal having rubber-adhering properties such as will effect an intimate union or bond with the rubber in the presence of heat and pressure. The sheet 10 and the rubber tread stock thus assembled are then subjected to a vulcanizing operation whereby to cure the rubber and to cause it to become bonded with the surface of the sheet 10. The composite blank thus produced is then cut into strips of desired lengths and widths and such strips subsequently are bent into circular form for attachment to wheels, as hereinbefore described.

The design of the tread 11 may be altered according to the type of the wheel and the character of its duty. For example, if the wheel is the driving wheel of a lawn mower or the like the tread may be formed with the corrugations 16 previously described so as to provide adequate traction with the ground. On the other hand, if the wheel is of the idle type, that is to say it merely performs a supporting function, the tread portion may be smooth. While the invention has been described in connection with a sheet or strip of brass or steel having a brass plating it will be understood that the plate 10 may be coated with other metals or materials to which rubber will adhere or may be bonded.

The new tires are particularly desirable from the standpoint of economy because they can be produced in the simplest kind of mold and they can be applied to the wheels with very little labor. They may be fitted to old and worn wheels with equal facility regardless of size, and when the rubber treads become worn, they may be replaced by new tires. They are of light weight, high efficiency and durability, and constitute a substantial advance in the art.

Other modifications and changes in proportion and arrangement of the several necessary elements constituting the invention, and in the method herein described may be made by those skilled in the art without departing from the nature and scope of the invention as defined in the appended claims.

What I claim is:

1. The method of making rubber tires for lawn mowers and the like which comprises the steps of coating a metallic sheet with a rubber-adhering material, molding a rubber tread portion on said sheet, cutting said sheet into strips of the desired dimension and bending said sheet and tread into circular form.

2. The method of making rubber tires for lawn mowers and the like which comprises the steps of plating a sheet of metal with a rubber-adhering metal, vulcanizing a rubber tread portion on said sheet to effect its union with said plating, cutting said sheet into strips of the desired dimension, and bending said strips into circular form.

3. The method of making rubber tires for lawn mowers and the like which comprises brass plating a metallic sheet, vulcanizing a rubber tread portion on said sheet to effect its union therewith, cutting said sheet into strips of the desired dimension, and bending said strips into circular form.

4. The method of making rubber tires for lawn mowers and the like which comprises the steps of coating a metallic sheet with a rubber-adhering material, molding a rubber tread portion on said sheet, cutting said sheet into strips of the desired dimension, bending said sheet and tread into circular form, and bonding the ends of said tread together to make a continuous uninterrupted tread.

RALPH W. SOHL.